UNITED STATES PATENT OFFICE.

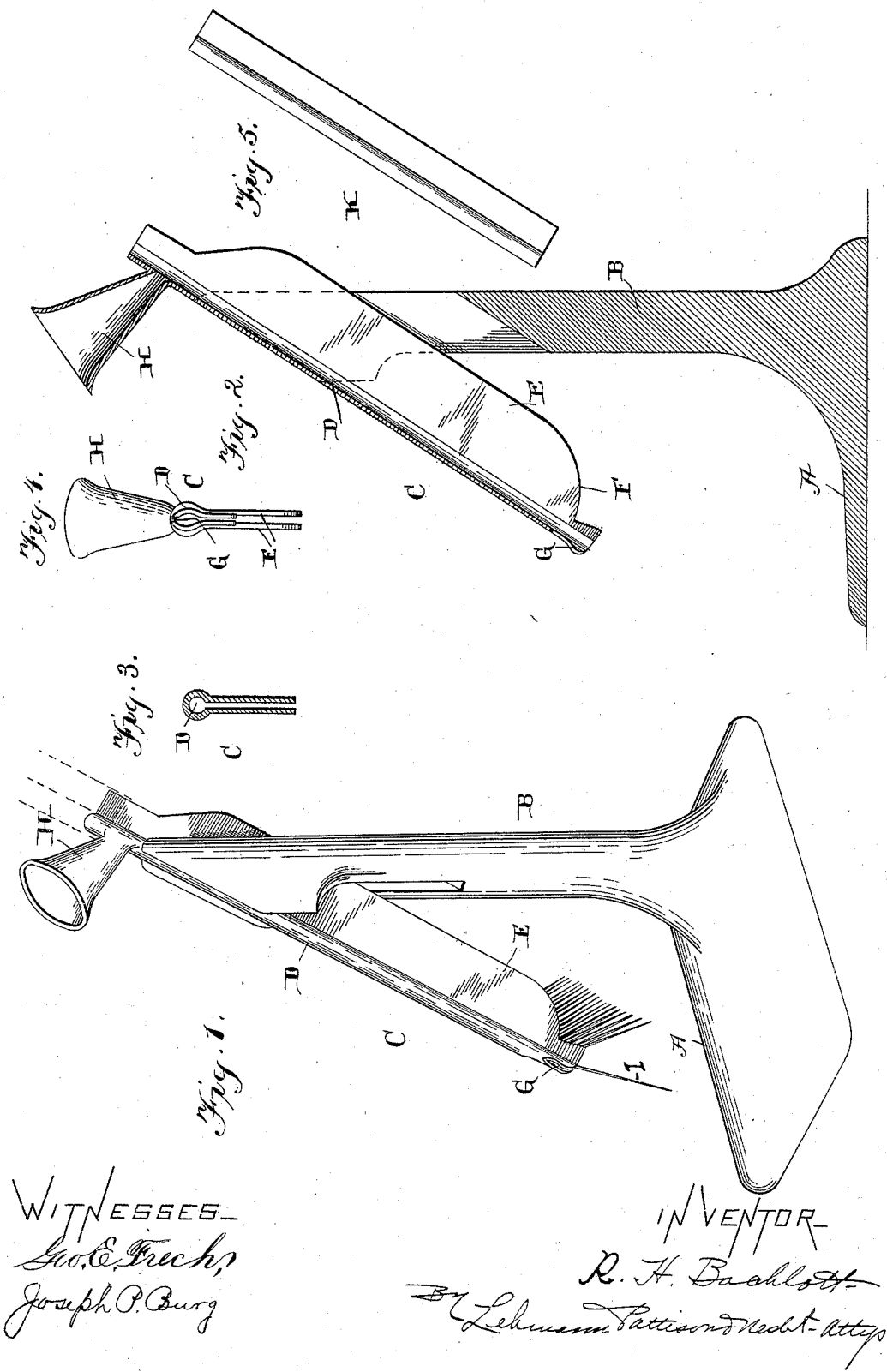

RICHARD H. BACHLOTT, OF SAVANNAH, GEORGIA.

PIN-HOLDER.

SPECIFICATION forming part of Letters Patent No. 534,943, dated February 26, 1895.

Application filed March 28, 1894. Serial No. 505,473. (No model.)

*To all whom it may concern:*

Be it known that I, RICHARD H. BACHLOTT, of Savannah, in the county of Chatham and State of Georgia, have invented certain new and useful Improvements in Pin-Holders; and I do hereby declare the following to be a full, clear, and exact description of the invention, such as will enable others skilled in the art to which it pertains to make and use the same, reference being had to the accompanying drawings, which form part of this specification.

My invention relates to an improvement in pin holders; and the object of the same is to provide an improved device for holding pins which feeds them in regular succession to a convenient point of discharge, where one pin is always ready for use, being projected in such a manner as to be very easily grasped when wanted. The removal of one pin positions another, and so on until the supply has become exhausted.

With this object in view the invention consists in certain novel features of construction hereinafter fully described and claimed, and illustrated in the accompanying drawings, in which—

Figure 1 is a perspective view of the device. Fig. 2 is a vertical sectional view. Fig. 3 is a cross sectional view of the chute. Fig. 4 is an end view. Fig. 5 is a detail view of a modified form of feeding device.

A designates the base of the device which is preferably of metal to give it weight and from the same extends standard B which is bifurcated at its upper end, and in the bifurcation is fitted the inclined chute C. The chute consists of a tubular top portion D from which depend the flanges E which form guides. The sides are cut backward as shown at F at their lower ends, while the corresponding end of the tube D is split as shown at G to form pin holding jaws which are inwardly sprung to engage and hold the end pin until removed therefrom in the manner presently to be stated. At the upper end of the chute is the hopper H communicating with tube D and through the same the pins are fed to the holder, one entering at a time as will be readily understood. The pins depend in the chute as shown with their heads in the tube D and owing to the incline of the chute they feed toward its lower end.

The lower or end pin I is positioned as shown in Fig. 1, with its point end projected so as to be readily grasped. A slight pull thereon separates the extremities of flanges E, thus freeing it from the holder, and this separation of the flanges permits the next succeeding pin to fall between the flange ends and into the position occupied by the pin preceding it. Thus it will be seen that one pin is always in readiness to be removed. The chute may also be supplied by a supplemental holder K, Fig. 5, which is formed with a head groove or tube and flanges in a manner similar to the chute and which is adapted to be removably secured to the upper end of the chute as shown in dotted lines in Fig. 1. This supplemental holder is first filled in any convenient manner and then placed on the chute, when the pins will run therefrom to the chute as will be readily understood.

Having thus fully described my invention, what I claim as new, and desire to secure by Letters Patent, is—

An improved pin holder comprising a support, inclined pin chute D positioned on the support and split longitudinally on its lower side, flanges E depending from the separated edges of the chute, and the lower end of the chute bifurcated on its upper side to form pin holding jaws, the said jaws being sprung inward, for the purpose shown and described.

In testimony whereof I affix my signature in presence of two witnesses.

RICHARD H. BACHLOTT.

Witnesses:
J. A. VARNEDOE,
E. L. NEIDLINGER.